(12) United States Patent
Elstermann

(10) Patent No.: US 11,503,353 B2
(45) Date of Patent: Nov. 15, 2022

(54) INTEGRATED RECEIVER DECODER MANAGEMENT IN HTTP STREAMING NETWORKS

(71) Applicant: ARRIS Enterprises LLC, Suwanee, GA (US)

(72) Inventor: Erik J. Elstermann, Carlsbad, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 375 days.

(21) Appl. No.: 16/195,996

(22) Filed: Nov. 20, 2018

(65) Prior Publication Data

US 2020/0162778 A1 May 21, 2020

(51) Int. Cl.
*H04N 21/262* (2011.01)
*H04N 21/235* (2011.01)
*H04N 21/6547* (2011.01)

(52) U.S. Cl.
CPC ... *H04N 21/26291* (2013.01); *H04N 21/2351* (2013.01); *H04N 21/2358* (2013.01); *H04N 21/6547* (2013.01)

(58) Field of Classification Search
CPC ......... H04N 21/26291; H04N 21/2351; H04N 21/2358; H04N 21/6547
See application file for complete search history.

(56) References Cited

U.S. PATENT DOCUMENTS

| | | | | |
|---|---|---|---|---|
| 10,397,636 B1* | 8/2019 | Kalva | ................ | H04N 21/6547 |
| 10,536,741 B1* | 1/2020 | Madison | ............. | H04N 21/242 |
| 2005/0163223 A1* | 7/2005 | Klamer | ................ | H04N 19/162 |
| | | | | 375/240.25 |
| 2010/0014594 A1* | 1/2010 | Beheydt | ........... | H04N 21/23608 |
| | | | | 375/240.26 |
| 2013/0219427 A1* | 8/2013 | Zundel | ............. | H04N 21/23424 |
| | | | | 725/32 |
| 2013/0260796 A1* | 10/2013 | Hasek | ..................... | H04L 67/32 |
| | | | | 455/456.3 |
| 2014/0129618 A1* | 5/2014 | Panje | ................ | H04N 21/26258 |
| | | | | 709/203 |
| 2014/0282657 A1 | 9/2014 | Sinha et al. | | |
| 2014/0282736 A1* | 9/2014 | Elstermann | ........ | H04N 21/4821 |
| | | | | 725/50 |
| 2016/0360244 A1 | 12/2016 | Einarsson et al. | | |

OTHER PUBLICATIONS

PCT/US2019/060380, Written Opinion of the International Searching Authority.

* cited by examiner

*Primary Examiner* — Kamal B Divecha
*Assistant Examiner* — Sandarva Khanal
(74) *Attorney, Agent, or Firm* — Chernoff, Vilhauer, McClung & Stenzel, LLP

(57) ABSTRACT

A method to provide configuration information from a broadcast network controller (BNC) to a decoder in an HTTP live streaming (HLS) network. The method includes the steps of: (a) initiating a configuration event notification by the BNC; (b) writing the configuration information as file; (c) announcing the configuration information as a SCTE-104 request; (d) translating the SCTE-104 request into an SCTE-35 message; (e) translating the SCTE-35 message into an HLS playlist file; and (f) retrieving the HLS playlist file at the decoder.

20 Claims, 8 Drawing Sheets

INTEGRATED RECEIVER DECODER MANAGEMENT IN HTTP STREAMING NETWORKS

FIELD

This disclosure relates generally to the field of broadcast networks and more specifically to providing a combined server-push and client-pull system for providing audio/video (AV) information to a content delivery network (CDN).

BACKGROUND

Traditional television and the Internet are both used to deliver audio/video (AV) content, such as entertainment and educational programs, to viewers. Television programming and other AV content is available not only from traditional sources like broadcast and cable television, but also from computers and mobile computing devices such as smart phones, tablets and portable computers. These devices may receive content via wired or wireless communications networks, in a home, business, or elsewhere.

Adaptive streaming, also known as adaptive bit rate (ABR) streaming, is a delivery method for streaming video over Internet Protocol (IP). ABR streaming is conventionally based on a series of short Hypertext Transfer Protocol (HTTP) progressive downloads which is applicable to the delivery of both live and on demand content Examples of ABR streaming protocols include HTTP Live Streaming (HLS), MPEG Dynamic Adaptive Streaming over HTTP (DASH), Microsoft Smooth Streaming, Adobe HTTP Dynamic Streaming (HDS), and the like. An ABR streaming client performs the media download as a series of very small files. The content is cut into many small segments (chunks) and encoded into the desired formats. A chunk is a small file containing a short video segment (typically 2 to 10 seconds) along with associated audio and other data. Adaptive streaming relies generally on the use of HTTP as the transport protocol for these video chunks, however, other protocols may be used as well (e.g., Real Time Messaging Protocol (RTMP) is used in HDS).

Playback is enabled by creating a playlist or manifest that includes a series of uniform resource identifiers (URIs) For example, a uniform resource locator (URL) is a species of URI. Each URI is usable by the client to request a single HTTP chunk A server, such as an origin server, stores several chunk sizes for each segment in time. The client predicts the available bandwidth and requests the best chunk size using the appropriate URI. Since the client is controlling when the content is requested, this is seen as a client-pull mechanism, compared to traditional streaming where the server pushes the content. Using URIs to create the playlist enables very simple client devices using web browser-type interfaces.

Adaptive streaming was developed for video distribution over the Internet, and has long been used (e.g., by Internet video service providers such as Netflix, Hulu, YouTube, and the like) to stream AV content, such as video content embedded in a web site, to an ABR streaming client upon request. The ABR client receives the AV content for display to a user. In order to deal with unpredictable network performance characteristics typical of Internet use, ABR streaming includes the ability to switch between different encodings of the same content. Depending upon available bandwidth, an ABR streaming client can choose an optimum encoding.

A number of Multichannel Video Programming Distributors (MVPDs), such as cable and broadband service providers who provide both cable and Internet services to subscribers, operate content delivery networks (CDNs) in which Internet Protocol (IP) is used for delivery of television programs (e.g., IPTV) over a digital packet-switched network. In some IPTV networks, adaptive bit rate streaming can be used for delivery of AV content, such as live or linear television programming and video on demand (VOD) content.

For traditional broadcast systems, however, the delivery of content to MVPDs relies on satellites to provide the content and related instructions to the MVPDs. The content is then pushed to decoders and/or transcoders and subsequently unicast or multicast to service provider networks for subscriber consumption. Systems and methods that could provide both a client-pull and server-push mechanism to provide content to MVPDs would be highly desirable. Accordingly, such systems and methods are disclosed herein.

SUMMARY

In accordance with one aspect of the invention, a method of providing a configuration information from a broadcast network controller (BNC) to a decoder in an HTTP live streaming (HLS) network is provided. The method includes the steps of: (a) initiating a configuration event notification by the BNC; (b) writing the configuration information as file; (c) announcing the configuration information as a SCTE-104 request; (d) translating the SCTE-104 request into an SCTE-35 message; (e) translating the SCTE-35 message into an HLS playlist file; and (f) retrieving the HLS playlist file at the decoder.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

An example embodiment of the present invention and its potential advantages are best understood by referring to FIGS. 1-8 of the drawings, like numerals being used for like and corresponding parts of the various drawings. The FIGS. 1-8, discussed below, and the various embodiments used to describe the principles of the present disclosure are by way of illustration only and should not be construed in any way to limiting the scope of the disclosure. Those skilled in the art will understand the principles of the present disclosure may be implemented in any suitably arranged mobile communication device, server and clients.

Figure 1:
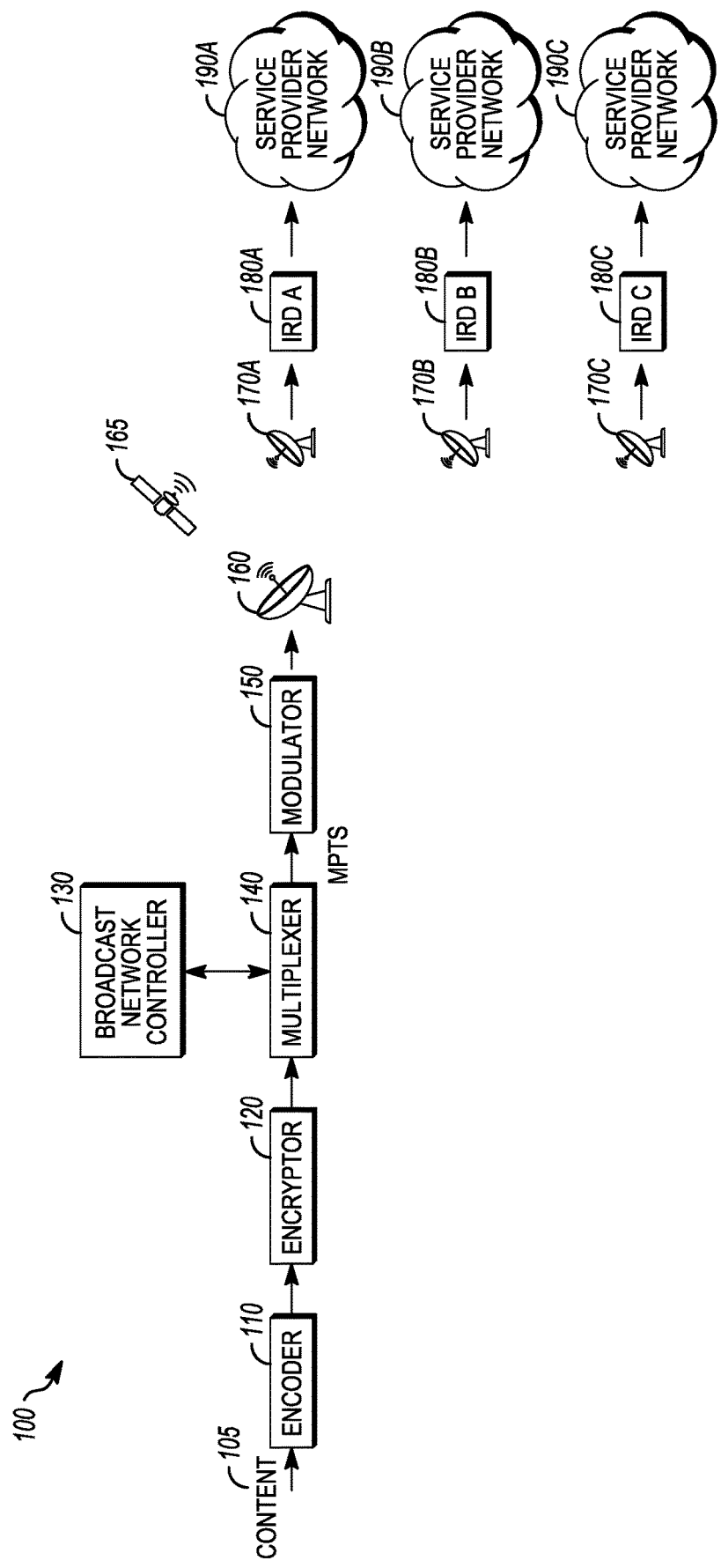
FIG. 1 is an overview of an illustrative broadcast satellite system that can be used for transmission of audio and/or video (AV) information.

FIG. 1 is a diagram depicting an exemplary embodiment of a broadcast satellite system 100 that can be used for transmission and/or storage and retrieval of audio and/or video content, such as television (TV) programming. The broadcast satellite system 100 comprises an encoder 110, which accepts audio-visual (AV) content 105 and processes the AV content 105 to generate encoded (compressed) AV content. The encoded AV content may be encrypted by encryptor 120 and multiplexed or combined by multiplexer 140 into a multiprogram transport stream (MPTS). The MPTS is then received at a modulator 150 where it is configured to be received by a communication station 160 and distributed to multiple multichannel video programming distributors (MVPDs) for delivery to end-users or subscribers. As shown, communication station 160 transmits MPTS data to communication stations 170a, 170b, 170c via a satellite link with satellite 165. Communications stations 170a, 170b, 170c provide MPTS data to integrated receiver decoders (IRDs) 180a, 180b, 180c, respectively. IRDs 180a, 180b, 180c may be used to decrypt, decode, and in some cases, transcode content for subscriber consumption. The processed content is then provided to service provider networks 190a, 190b, 190c, respectively.

Also shown in FIG. 1 is a broadcast network controller (BNC) 130, in communication with multiplexer 140. BNC 130 may be used to manage IRDs 180a, 180b, 180c including service authorization and format of content provided to the service provider networks 190a, 190b, 190c. For example, the resolution, frame rate, and bit rate of content provided to subscribers.

Figure 2:
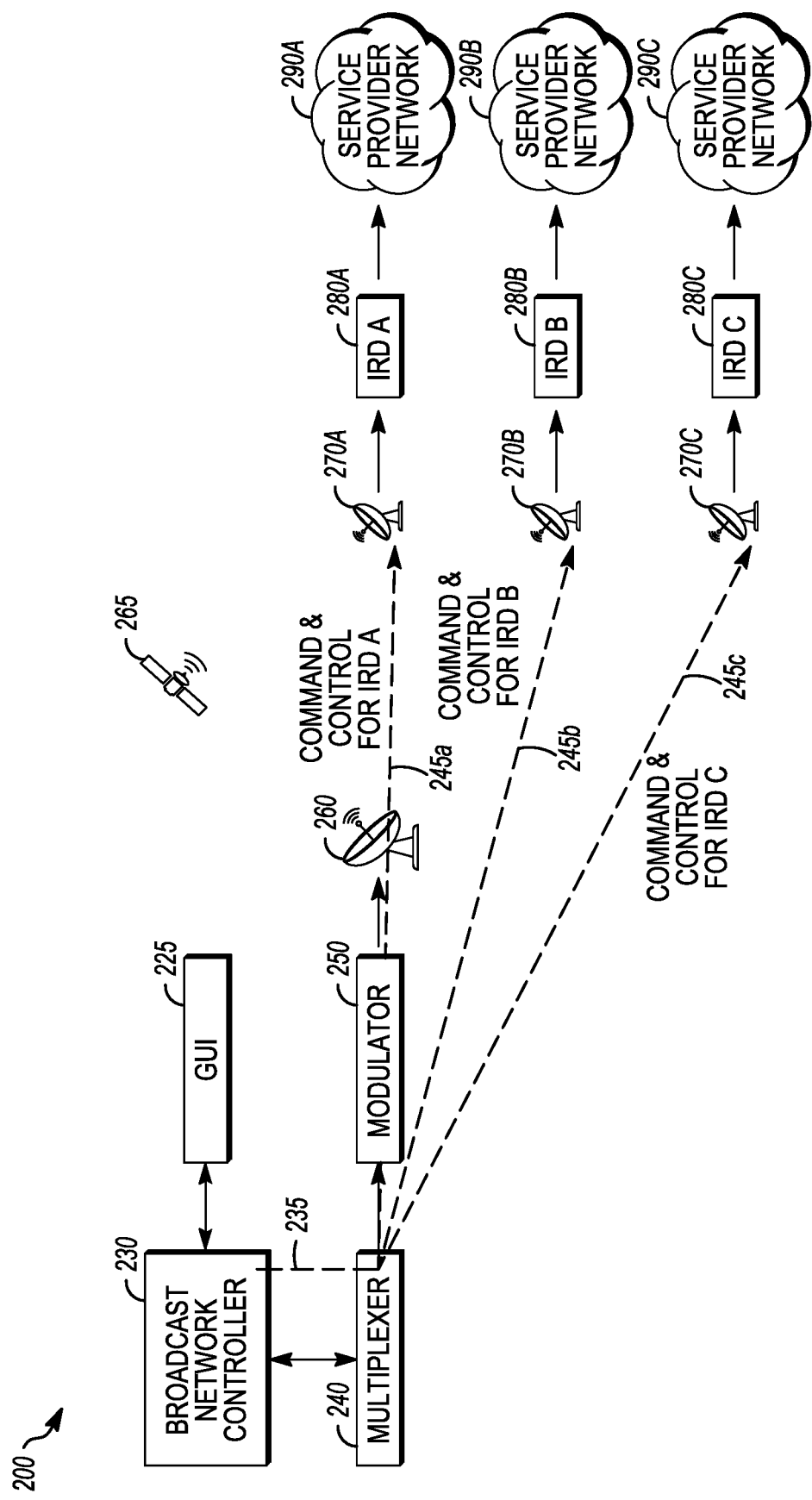
FIG. 2 illustrates command and control message information pushed through the broadcast satellite system of FIG. 1.

FIG. 2 is a block diagram illustrating command and control message information pushed through the broadcast satellite system of FIG. 1. As shown, satellite system 200 comprises a BNC operator graphic user interface (GUI) 225, BNC 230, multiplexer 240, modulator 250, communication station 260, satellite 265, communication stations 270a, 270b, 270c, IRDs 280a, 280b, 280c, and service provider networks 290a, 290b, 290c. The BNC 230 provides IRD command and control messages embedded within a transport stream (TS) 235. IRD command and control messages may include authorization, content selection, output configuration, and the like. IRD command and control messages may be broadcast to all IRDs 280a, 280b, 280c or targeted to individual IRDs or specific groups of IRDs.

As shown, IRD command and control messages are targeted to individual IRDs, e.g., a command and control for IRD A TS 245a is provided to IRD A 280a, a command and control for IRD B TS 245b is provided to IRD B 280b, and a command and control for IRD C TS 245c is provided to IRD C 280c. The command and control messages may be initiated in various ways. For example, the messages may be scheduled or triggered by an operator via a computer, providing a GUI 225 to the BNC 230. Alternately, the messages may be scheduled or triggered by a business system computer(s) (not shown) connected to the BNC 230 via an Application Programming Interface (API).

Figure 3:
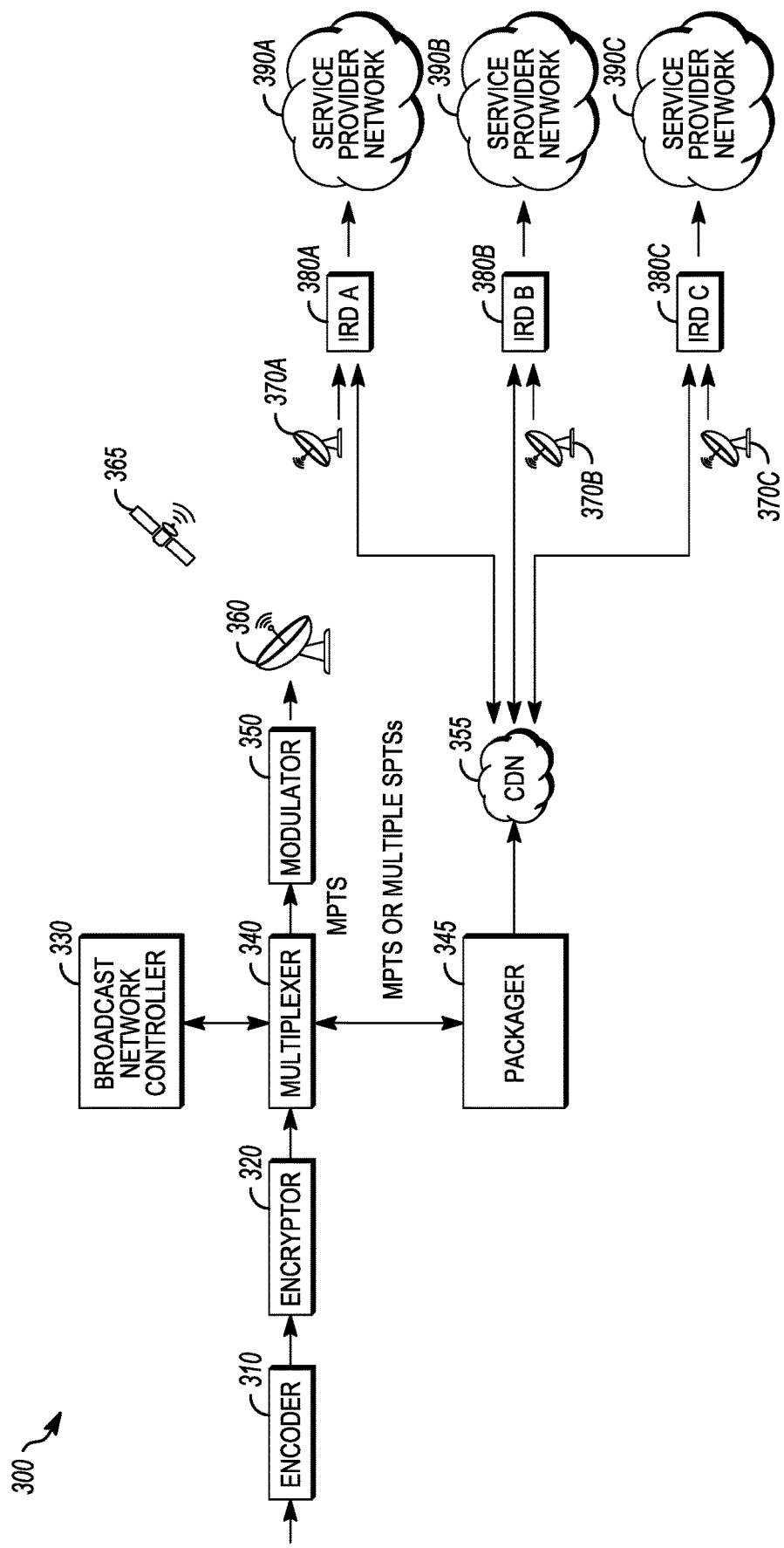
FIG. 3 illustrates a desirable solution for combining a server-push and client-pull system process for providing AV information to Multichannel Video Programming Distributors (MVPDs).

FIG. 3 is a block diagram depicting an exemplary embodiment of a solution for combining a server-push and client-pull system process for providing AV information to a content delivery network (CDN). Combined system 300 comprises encoder 310, encryptor 320, BNC 330, multiplexer 340, modulator 350, packager 345, content delivery network (CDN) 355, communication station 360, satellite 365, communication stations 370a, 370b, 370c, IRDs 380a, 380b, 380c, and service provider networks 390a, 390b, 390c. FIG. 3 is similar to FIG. 2, with the addition of packager 345 and CDN 355. Packager 345 may be a software application designed to convert MPEG-2 transport streams to HLS-compliant content (chunks) and associated playlist files. CDN 355 may be a public or private network designed to support delivery of files via HTTP.

In system 300, encrypted content is provided to packager 345 as a MPTS or multiple single-program transport streams (SPTSs). Packager 345 conditions these inputs (e.g., MPTS or SPTSs) for delivery via bidirectional network connections (e.g., using HTTP) and provides it to CDN 355. Thereafter, each IRD "client" 380a, 380b, 380c may pull content via CDN 355 and/or receive content pushed via satellite (e.g. from satellite link with communication station 360, satellite 365, and communications station 370a, 370b, 370c).

A benefit of system 300 is that it allows program providers (e.g., such as traditional broadcast providers) to use terrestrial (e.g., internet protocol (IP)) networks to distribute content to MVPDs. In some embodiments, MVPD- or region-specific programming may be distributed without consuming broadcast satellite transponder capacity for this non-broadcast content. In some embodiments, CDN 355 may act as a secondary (e.g., redundant) distribution path. This redundant path may be desirable and act as insurance against satellite failures (e.g., satellite transponder failures). In other embodiments, CDN 355 may act as a primary content distribution path for program providers. This primary path may be desirable for program providers who do not employ satellite transponders as their primary means of distribution.

As will be appreciated, CDN 355 may support IP for delivery of television programs (e.g., IPTV) over a digital packet-switched network. In some embodiments, adaptive bit rate streaming (e.g., HLS) can be used for delivery of AV content, such as live or linear television programming and VOD) content. A benefit of employing CDN 355 and the HLS standard is that many existing networks are configured to support a "pull" model (e.g., using the HTTP protocol) to download files to clients. Consequently, no additional protocols need to be supported by system 300.

Figure 4:
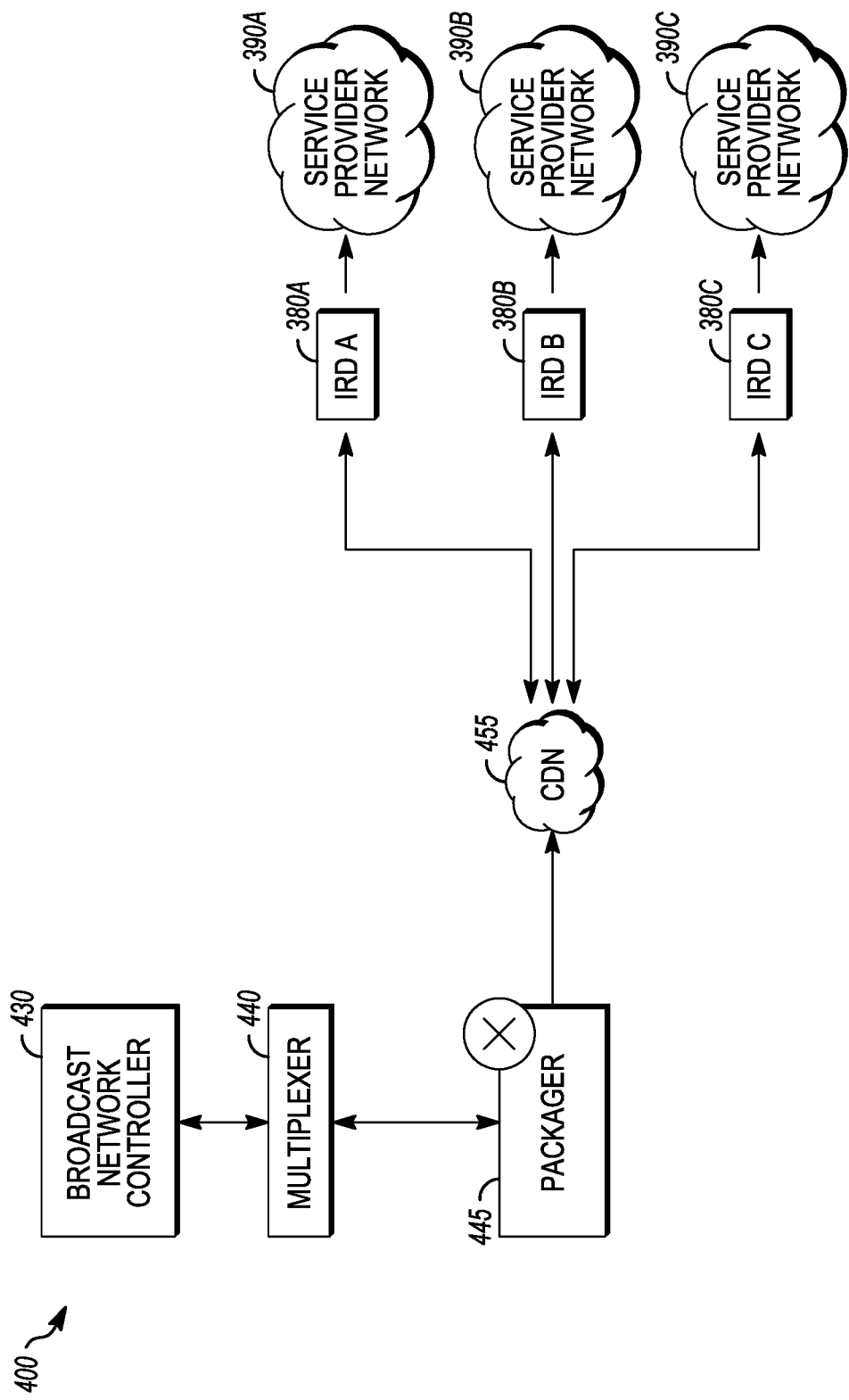
FIG. 4 illustrates an inherent packager flaw with the proposed solution of FIG. 3.

FIG. 4 is a block diagram illustrating an inherent packager flaw in system 300 of FIG. 3. System 400 comprises BNC 430, multiplexer 440, packager 445, content delivery network (CDN) 455, IRDs 380a, 380b, and 380c, and service provider networks 390a, 390b, and 390c. As is appreciated, standard packagers like packager 445 do not currently forward IRD command and control messages embedded in input streams (e.g., transport streams (TSs)). These messages may include service entitlements (e.g., entitlement management messages (EMMs)) and/or receiver/transcoder configuration messages. As these messages are typically proprietary in nature, it cannot be expected that a standard HLS-compliant packager implementation will support conveyance of these messages without significant development and interoperability test burden. Consequently, if a satellite path does not exist (such as shown in FIG. 4), the program provider is unable to manage the IRD network.

Figure 5:
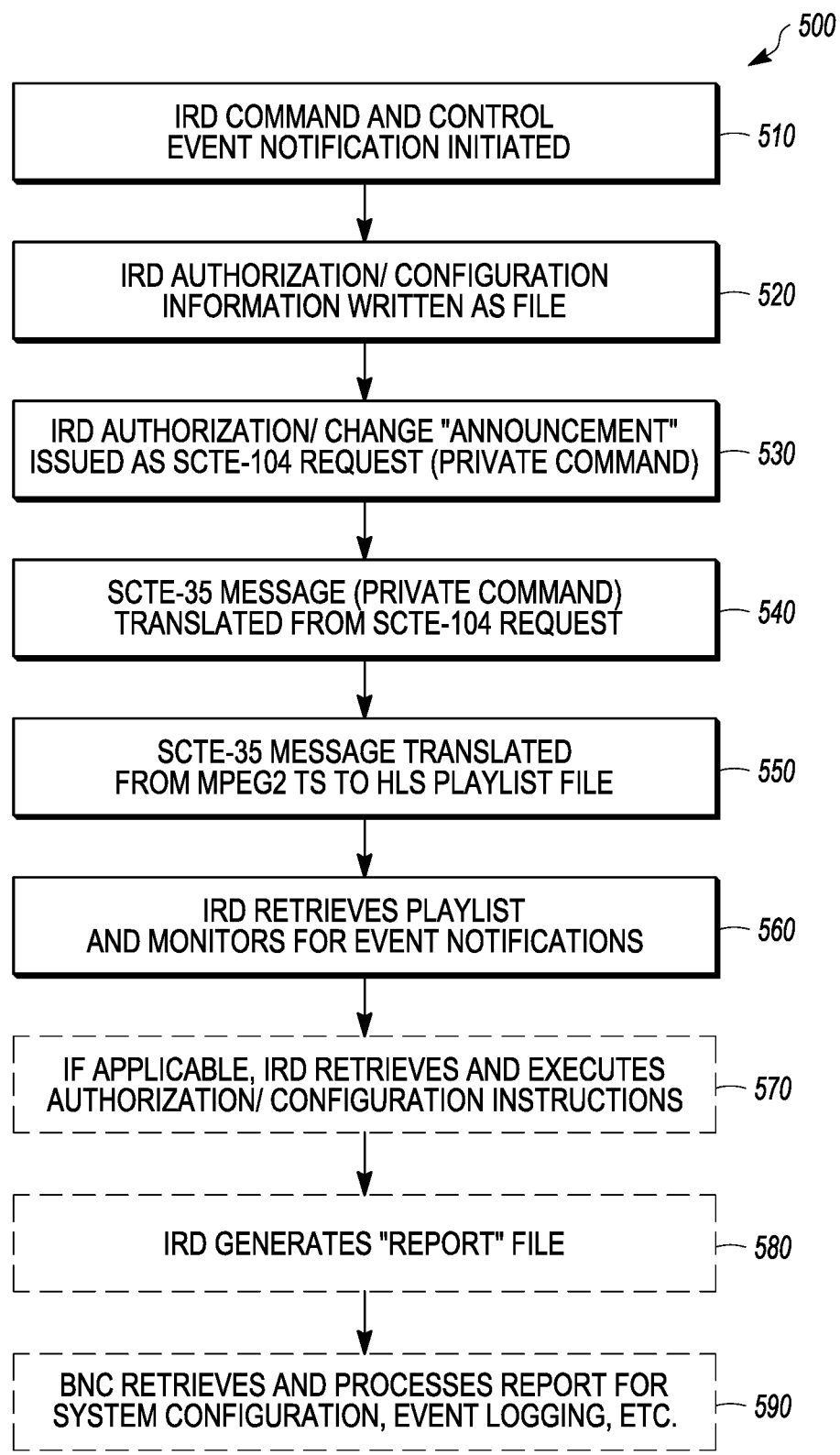
FIG. 5 illustrates a general flowchart for providing AV information and control and command information to an MVPD, which overcomes the packager flaw in FIG. 4.
Figure 6:
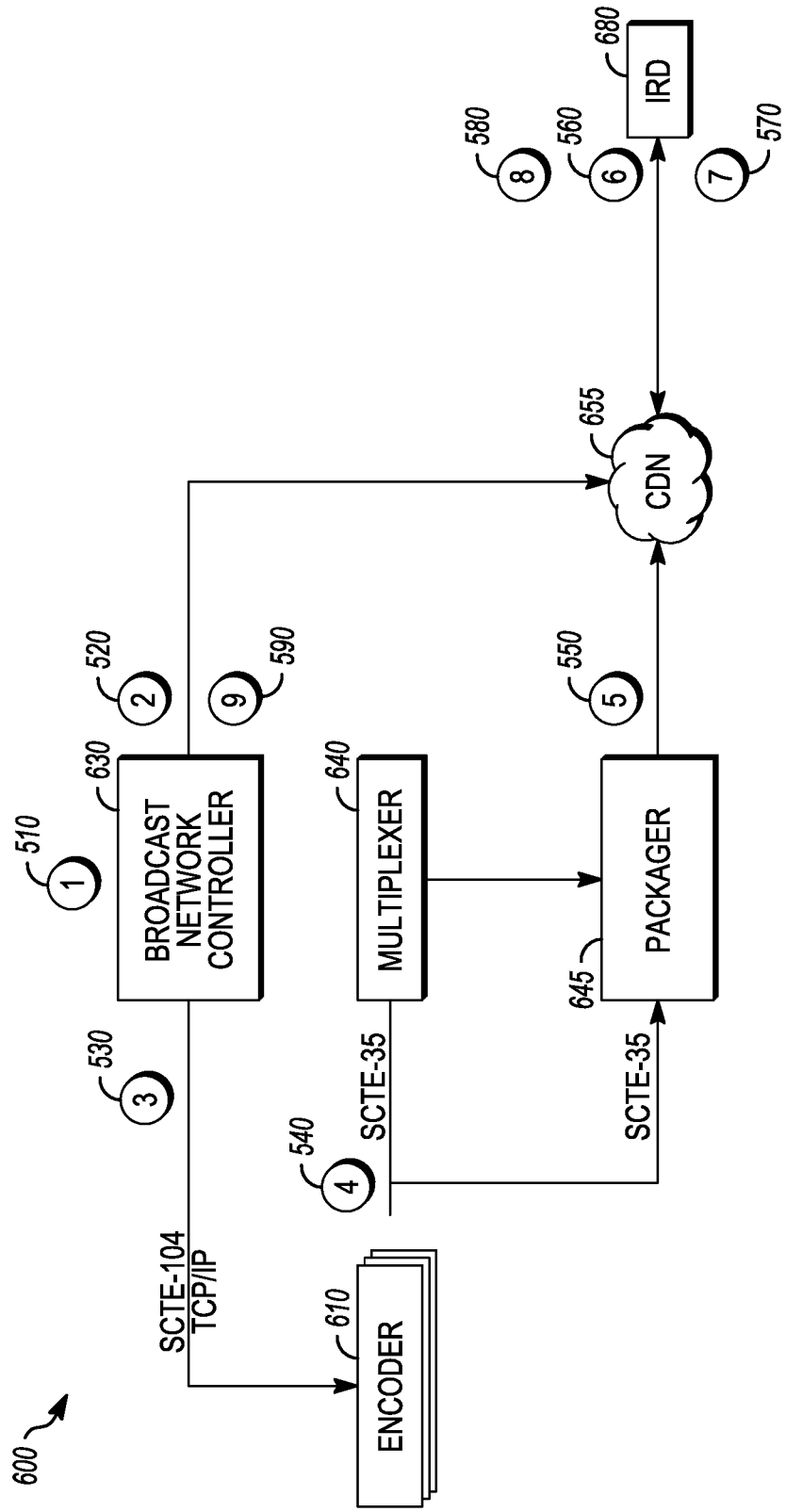
FIG. 6 illustrates flow of information between system components for the process described in FIG. 5.

Proposed herein is a solution that employs industry standard solutions to signal and forward IRD command and control messages or events through next-generation networks (e.g., CDNs). FIG. 5 illustrates a general process 500 for providing AV information and control and command information to a CDN and FIG. 6 illustrates flow of information between system components for the process 500 described in FIG. 5.

In some embodiments, this disclosure leverages industry standard protocols for signaling events in MPEG-2 transport streams and translating those event notifications into HLS-compliant manifest files. Specifically, SCTE-104 defines an Application Programming Interface for automation systems to signal events to compression (encoder) systems. Traditionally, such events were notifications to insert advertisements downstream from the compression system (e.g., at an MVPD headend office or other regional facility), thereby replacing broadcast ads with regional or local ads. However, the API has been enhanced to also support the conveyance of private information, which may or may not be related to ad insertion. This disclosure leverages this mechanism for conveyance of proprietary messages to a network of IRDs. The disclosure also leverages the SCTE-35 standard, a companion to SCTE-104. SCTE-35 describes the format and syntax of messages conveyed via MPEG-2 transport streams generated by compression systems, typically initiated by SCTE-104 transactions from an automation or business system to the compression system. The disclosure also leverages the HLS standard which has been enhanced to support translation of SCTE-35 messages embedded in MPEG-2 transport streams to HLS playlist files.

At step 510, an IRD command and control message or event is initiated. In some embodiments, a BNC 630 or BNC operator (e.g., program provider) initiates the IRD command and control message. At step 520, this IRD authorization/configuration information is written as a file (e.g., to a CDN 655). In some embodiments, the BNC 630 publishes the instructions (e.g., files) to the network for subsequent retrieval and execution by target IRDs 680. This publication may be done concurrently with initiating the IRD command and control message.

At step 530, an IRD configuration/change announcement is issued as an SCTE-104 request (private command). The SCTE-104 standard (conveying private data) is employed by the BNC to trigger event notifications to one, some, or all IRDs 680 in the network. The private command syntax used may be proprietary. At step 540, an SCTE-35 message is translated from the SCTE-104 request. The SCTE-104 request may be translated by an encoder 610 or multiplexer 640 for carriage in MPEG-2 transport.

At step 550, the SCTE-35 message is translated from MPEG-2 transport to an HLS file (e.g. metadata). As shown, packager 645 is HLS-compliant and translates the SCTE-35 message per the IETF RFC 8216 standard. In some embodiments, HLS playlist files are published routinely by the packager per HLS standard. The SCTE-35 private command(s) may be embedded in playlists. Private command data may include the following event notification information: (1) target recipient(s): broadcast, specific IRD, or IRD group and (2) command and control information instructions URL (e.g., location of command and control instruction file(s)). At step 560, the IRD 680 retrieves the playlist and monitors for event notifications. The IRD 680 processes the HLS playlist metadata for command and control event notifications. At optional step 570, if applicable, the IRD 680 retrieves and executes authorization/configuration instructions.

At optional step 580, the IRD 680 generates a report file. The report file may be saved to the CDN 655 (e.g., per BNC 630 instruction). The report file may include current and historical IRD configuration, health, status information, etc. At optional step 590, the BNC 630 retrieves and processes the report for system confirmation, event logging, etc. The report file may be periodic or triggered by the BNC. The BNC may retrieve the reports at its discretion (e.g., when necessary or desirable).

Figure 7:
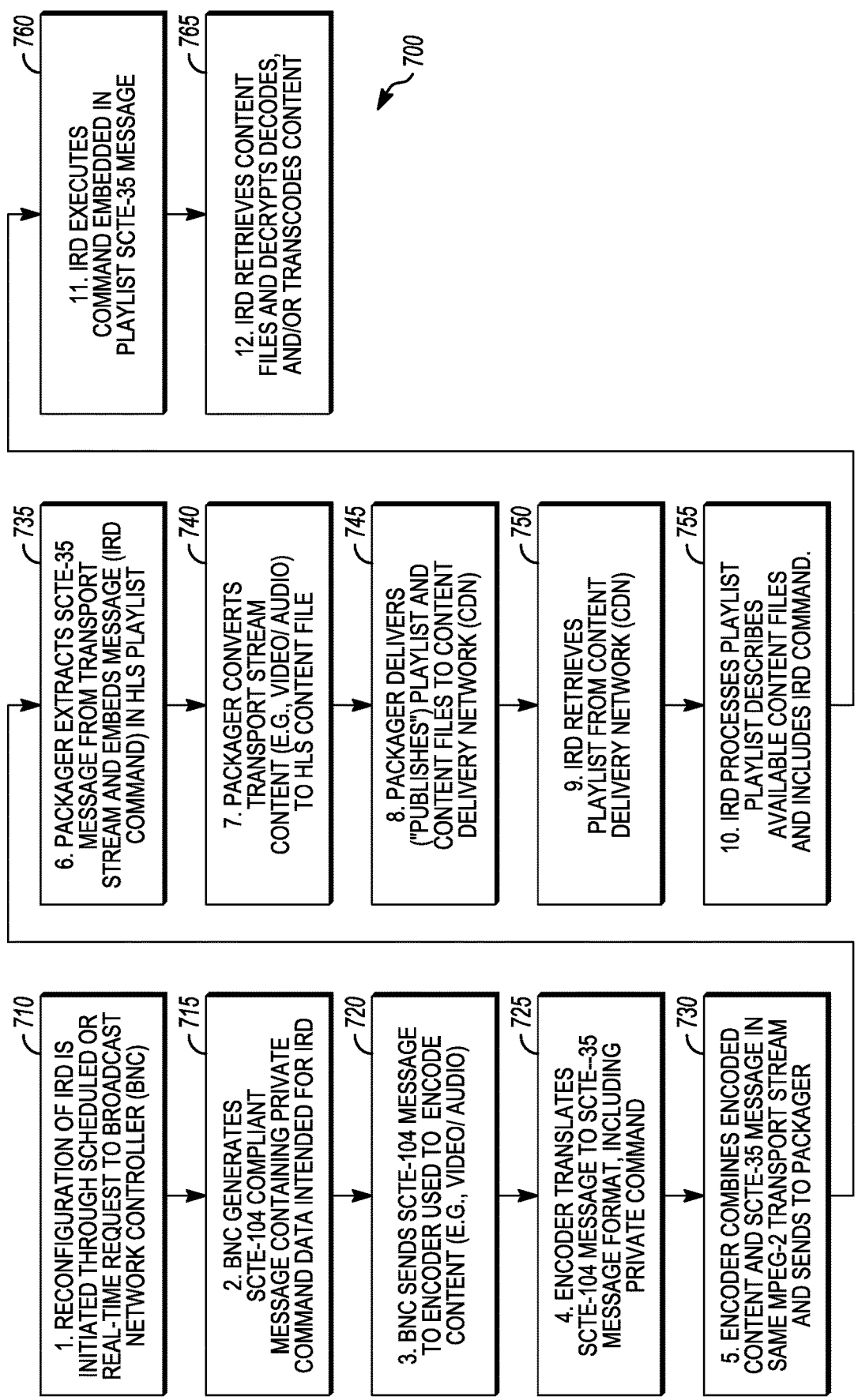
FIG. 7 illustrates a flowchart for when a command is embedded in a playlist.
Figure 8:
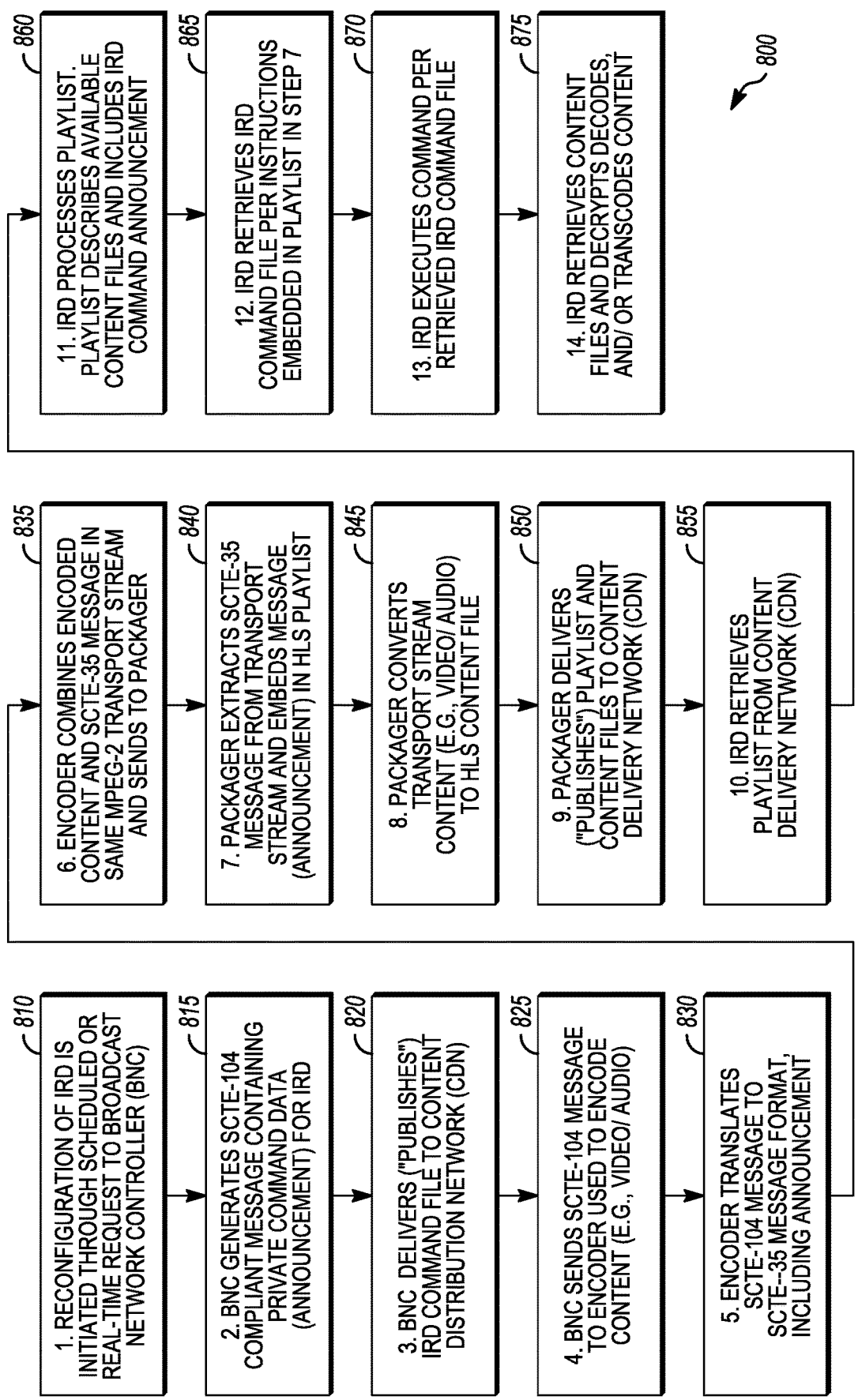
FIG. 8 illustrates a flowchart for when a command is announced in a playlist and retrieved by a decoder.

FIG. 7 and FIG. 8 illustrate more specific flow charts for the process provided in FIG. 5. FIG. 7 illustrates a process 700 for when a command is embedded in a playlist. At step 710, reconfiguration of an IRD is initiated through a scheduled or real-time request to the BNC. At step 715, the BNC generates an SCTE-104 compliant message including private command data intended for the IRD. At step 720, the BNC sends the SCTE-104 message to an encoder (used to encode content (e.g., audio/video)).

At step 725, the encoder translates the SCTE-104 message to SCTE-35 message format, including private command(s) that may be specified by the SCTE-104 request. At step 730, the encoder combines the encoded content and SCTE-35 message in the same MPEG-2 transport stream and sends it to the packager.

At step 735, the packager extracts the SCTE-35 message from the transport stream and embeds the message (IRD command) in the HLS playlist. At step 740, the packager converts the stream content (e.g. audio/video) to HLS content files. At step 745, the packager delivers (publishes) the playlist and content files to the CDN.

At step 750, the IRD retrieves the playlist from the CDN. In some embodiments, the IRD retrieves the playlist routinely as part of its process to retrieve content files. At step 755, the IRD processes the playlist. As is appreciated, the playlist will normally describe available content files and may include IRD commands initiated by the BNC. At step 760, the IRD executes command embedded in the playlist. At step 765, the IRD retrieves content files and decrypts, decodes and/or transcodes content.

FIG. 8 illustrates a process 800 for when a command is announced in a playlist and retrieved by a decoder. At step 810, reconfiguration of an IRD is initiated through a scheduled or real-time request to the BNC. At step 815, the BNC generates an SCTE-104 compliant message including private command data (announcement) for the IRD. At step 820, the BNC delivers (publishes) the IRD command file to the CDN. At step 825, the BNC sends the SCTE-104 message to an encoder (used to encode content (e.g., audio/video)).

At step 830, the encoder translates the SCTE-104 message to SCTE-35 message format, including the announcement embedded in a private command. At step 835, the encoder combines the encoded content and SCTE-35 message in the same MPEG-2 transport stream and sends it to the packager.

At step 840, the packager extracts the SCTE-35 message from the transport stream and embeds the message (announcement) in the HLS playlist. At step 845, the packager converts the stream content (e.g. audio/video) to HLS content files. At step 850, the packager delivers (publishes) the playlist and content files to the CDN.

At step 855, the IRD retrieves the playlist from the CDN. At step 860, the IRD processes the playlist. As is appreciated, the playlist may describe available content files and include IRD commands (in this example, an announcement of the presence of command file(s) to be retrieved by the IRD). At step 865, the IRD retrieves the IRD command file per instructions embedded in playlist in step 840. At step 870, the IRD executes command per retrieved IRD command file. At step 875, the IRD retrieves content files and decrypts, decodes and/or transcodes content.

It should be understood that the various system components (such as encoder 610, multiplexer 640, packager 645, etc.) can be implemented as physical devices. Alternatively, the system components can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory of a computer. As such, system components (including associated data structures and methods employed within the system components) can be stored on a computer readable medium or carrier, e.g., RAM memory, magnetic or optical drive or diskette and the like.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine-readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

While the foregoing is directed to embodiments of the present invention, other and further embodiments of the invention may be devised without departing from the basic scope thereof, and the scope thereof is determined by the claims that follow.

What is claimed is:

1. A method of providing configuration information from a broadcast network controller (BNC) to a decoder in an HTTP live streaming (HLS) network, the method comprising:
   (a) initiating a configuration event notification by the BNC;
   (b) writing the configuration information as a file;
   (c) announcing the configuration information as a SCTE-104 request;
   (d) translating the SCTE-104 request into an SCTE-35 message;
   (e) translating the SCTE-35 message into an HLS playlist file; and
   (f) retrieving the HLS playlist file at the decoder.

2. The method of claim 1, wherein the configuration information comprises decoder command and control event notification information comprising one or more of authorization, content selection, and output configuration.

3. The method of claim 1, wherein the SCTE-104 request is translated by an encoder into a SCTE-35 message having a configuration information.

4. The method of claim 3, wherein the encoder combines encoded content and the SCTE-35 message having configuration information in a same MPEG-2 transport stream (TS) and sends to a packager.

5. The method of claim 4, wherein the packager extracts the SCTE-35 message from the TS and embeds the configuration information into an HLS playlist file.

6. The method of claim 5, wherein the packager converts TS content into HLS content files.

7. The method of claim 6, wherein the packager delivers HLS playlist and content files to a content delivery network.

8. The method of claim 7, wherein the decoder retrieves the HLS playlist from the content delivery network.

9. The method of claim 8, wherein the decoder processes the HLS playlist.

10. The method of claim 9, wherein the decoder retrieves configuration information embedded in the HLS playlist file.

11. The method of claim 10, wherein the decoder executes commands from the configuration information embedded in the HLS playlist file.

12. The method of claim 11, wherein the decoder retrieves content files and decrypts, decodes, and/or transcodes content.

13. The method of claim 1, wherein the decoder receives the HLS playlist file as part of routinely receiving an HLS playlist and monitors for event notifications.

14. The method of claim 1, further comprising:

retrieving and executing instructions provided by the configuration information at the decoder.

15. The method of claim 1, further comprising:

generating a report file at the decoder, the report file comprising one or more of current and historical decoder configuration, health and status information.

16. The method of claim 15, further comprising:

receiving and processing the report file at the BNC for system configuration, event logging.

17. The method of claim 1, wherein initiating a configuration event notification is scheduled in advance or requested via the BNC.

18. The method of claim 1, wherein the writing the configuration information as a file comprises generating a proprietary file to the CDN for retrieval by a decoder.

19. The method of claim 1, wherein the announcing the configuration information as a SCTE-104 request comprises generating an SCTE-104 message including private command data to an encoder instructing a decoder where to obtain a configuration file, and wherein the SCTE-104 request further comprises decryption information for the configuration file.

20. The method of claim 1, wherein the configuration information from a broadcast network controller (BNC) to a decoder in an HTTP live streaming (HLS) network is provided in addition to configuration information provided by a BNC in a satellite broadcast system.

* * * * *